Re 1182

Sheet 1 - 2 Sheets.

D. S. McNamara.

Mower.

Reissued May 7, 1861.

No 77
No 1182

RE 1182

Sheet 2. 2 Sheets.

D. S. McNamara.

Mower.

No 77
No 1182

Reissued May 7, 1861.

Witnesses:

Wm. Yorke Stevens
A. C. Addicombe

Inventor:

D. S. McNamara
By his Attorney
Thos. H. Dodge

UNITED STATES PATENT OFFICE.

D. S. McNAMARA, OF TROY, NEW YORK, ASSIGNOR TO G. M. SELDEN.

IMPROVEMENT IN HARVESTERS.

Specification forming part of Letters Patent No. 21,612, dated September 28, 1858; Reissue No. 1,182, dated May 7, 1861.

*To all whom it may concern:*

Be it known that I, DAVID S. McNAMARA, formerly of North Hoosic, New York, but now of Troy, in the county of Rensselaer and State of New York, have invented certain new and useful Improvements in Grain and Grass Harvesters; and I do hereby declare that the following is a full, clear, and exact description of the same, reference being had to the accompanying drawings, forming a part of this specification, and in which—

Figure 1:
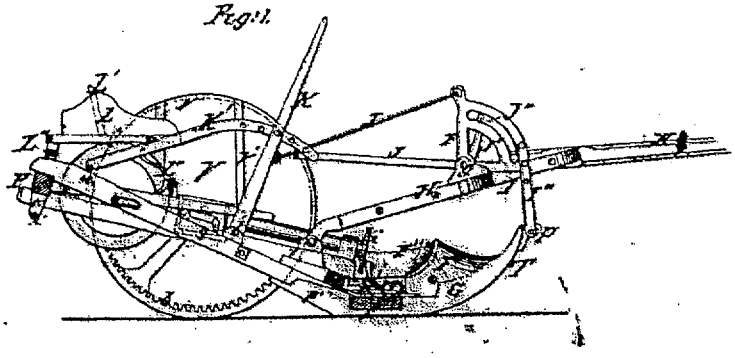
Figure 2:
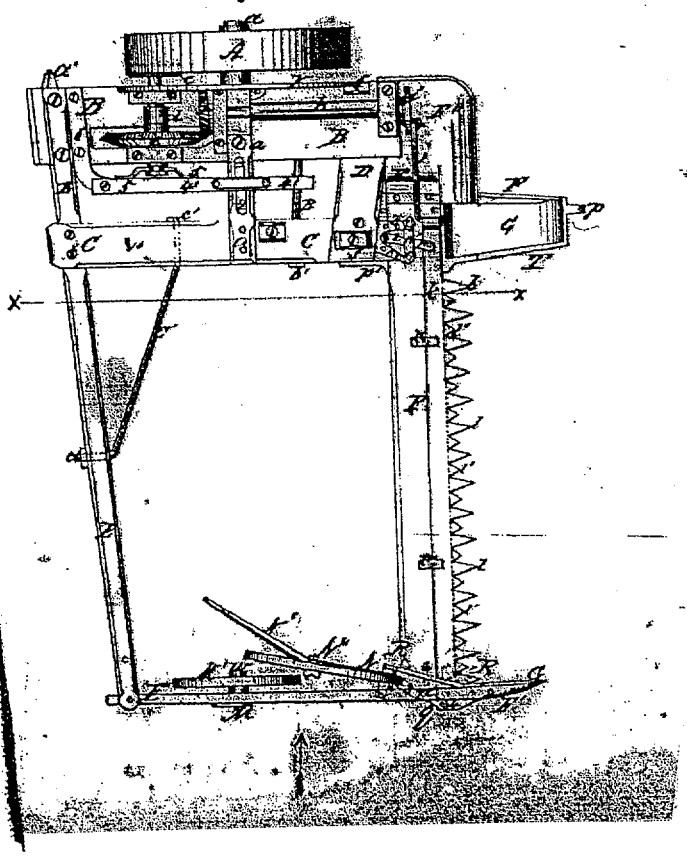
Figure 5:
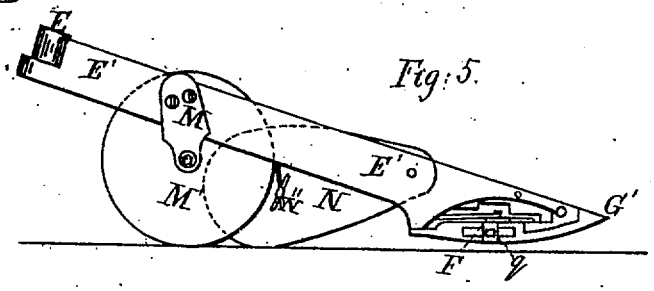
Figure 4:
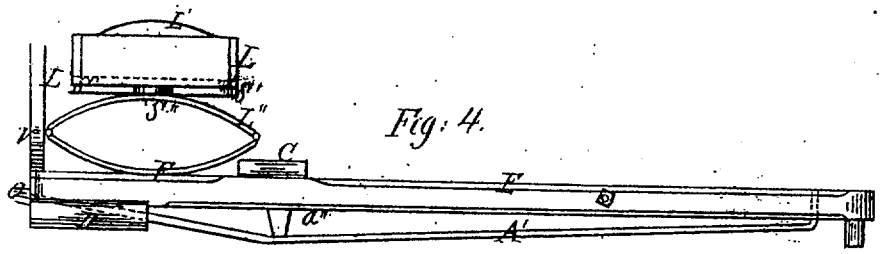
Figure 3:
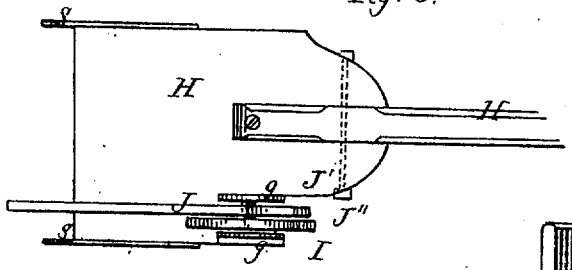
Figure 7:
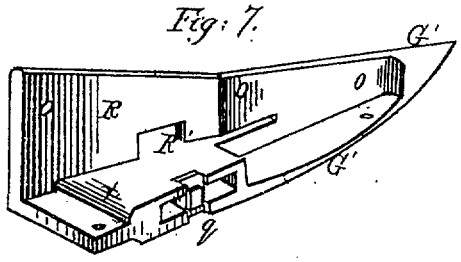
Figure 6:
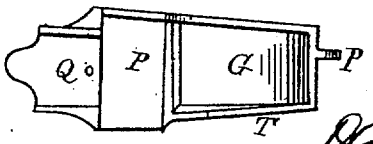

Figure 1 represents a section on line *x x*, Fig. 2. Fig. 2 represents a plan or top view of the machine, with the seat, tongue, and levers for raising the cutting apparatus removed in order to show the frame-work more fully. Figs. 3, 4, 5, 6, and 7 represent views of certain parts of the machine detached.

The main frame of the machine is composed of pieces C, D, B, and E, the latter extending out in an elevated position in rear of the finger-beam F, as indicated and shown in Figs. 1 and 2.

That side of the machine which runs next to the standing grass I call the "inside" of the frame, while that next to the cut grass or grain, and by the side of which the main wheel A runs, I call the "outside" of the frame.

The construction of the main frame is such that the rear of the frame, together with the front outer corner thereof, are elevated above the ground, while the front inner corner is depressed down near the ground. This is effected by fastening piece E to the top of B, while piece D is fastened to the under side of B and to the top of C, the rear of the latter being fastened to the top of E. In this way the front end of C is inclined down, as fully shown in Fig. 1. It will also be observed that the pieces D and E converge toward each other as they extend from piece B, so that after being fastened to piece C a frame of great strength is produced, owing to the bracing position of the parts D and E.

The nature of the invention which forms the subject matter of this patent has for its object, fisrt, such an arrangement of parts as to admit the adjustable connection of the shoe with the right-angled lever to work up and down in front of the main frame without chafing or twisting against said frame; second, such a construction and combination of parts as to permit of the crank end of the pitman working in an elevated position in front of the outer corner of the frame, while the other end is inclined down to the heel of the cutter-bar which rests on a metallic shoe supported near to the ground and below the inner front corner of the main frame; third, such an arrangement of the shoe which supports the heel of the finger-beam, the hinge of the tongue, and location of the pitman as that the right-angled lever which is fulcrumed to the tongue will connect with the shoe in front of the pitman; fourth, so arranging the right-angled lever by which the cutter-bar is raised as that its horizontal arm will project as far forward as the front curved end of the shoe which supports the heel of the finger-beam, whereby the adjustable link-connection of the lever with the front end of the shoe will be operated in nearly a vertical position.

In the accompanying drawings the foregoing improvements are shown applied to a McNamara grass-harvester, so much of which will now be described as is necessary to a full understanding of the improvements, the other parts and details of said machine being fully set forth by me in other patented divisions of even date herewith, and to which reference is to be had.

G is a metallic shoe, into the recess Q of which the front end of piece C is securely bolted, while the heel of the finger-beam F, which supports the cutter-bar K, is fastened into a recess, P. It will thus be seen that the front part, T, of shoe G projects forward of the front of the main frame, so that the adjustable link-connection between the shoe and right-angled lever I upon the rear of tongue H H′ is no way interfered with when it is operated to raise the cutter-bar by means of lever K and connection I′, the former being within reach of the driver in his seat L. The tongue or draft-beam is provided with curved metallic standards or eye-pieces *s s*, which are hinged between ear-pieces *s′ s′* on the main frame in rear of the pitman *j*, which is operated by a crank-pin on the balance-wheel *i* on the front end of shaft *h*. The position of the pitman is therefore such as respects the main frame, that it is free to work up and down in front of the frame; hence the length of the pitman can be nearly the whole width of the frame and yet be elevated at the crank, and even above the frame when the crank is up. The other end of the pitman inclines down toward the ground, and is connected to the heel of the cutter-bar *k* in any well-known manner. The cutter-bar is hinged to arms *n* *n'*, which work under proper guides, and whose rear ends are also hinged, whereby the cutters *l l'*, as they are operated, have a reciprocating curvilinear motion, which adds much to their effectiveness. Any well-known forms of fingers may be used, if desired. The crank-shaft *h* has on its rear end a bevel-gear, *f*, which gears into one, *e*, on a horizontal shaft, *d*, arranged back of the point of oscillation of the main frame, which is supported on wheels A and M.

On the outer end of shaft *d* is a spur-gear, *c*, which works in gear *b*, attached to the inner periphery of the main wheel A, which turns on a stationary journal, *a*, fastened to the upper side of the frame. Gear *e* is so arranged, it will be seen, that it occupies a position at the rear outer corner of the main frame, thus enabling the crank-shaft *h* to be placed on the front outer side of the frame, where it is mostly out of the way, while it enables a long pitman to be employed with its crank end elevated well out of the reach of obstructions. The gearing which operates the cutting apparatus can be thrown in and out of action by means of a lever device, 4', 5 5, 7, and 8.

I'' is an adjustable link device, its lower end being connected to the point of the shoe at *p*, while its upper end is connected to the front end of the horizontal arm of right-angled lever I, and is also so constructed that the distance between the point of shoe G and lever I can be made greater or less by simply hitching up the link device shorter or letting it out. The horizontal arm of lever I, which has its fulcrum supported on the rear inner side of the hinged tongue H H', is so proportioned and arranged as respects the shoe which supports the heel of the finger-beam upon which the cutter-bar works as that the point of the lever and shoe will occupy about the same vertical plane, in order to prevent cramping and twisting of the connection, as well as to enable the cutter-bar to be raised with as little upward motion of the horizontal arm of the right-angled lever as possible. The rear of the hinged tongue being connected to the frame by means of curved metallic standards or eye-pieces, the tongue can be made strong and yet light, while it is elevated so as to leave a sufficient space between the pitman, balance-wheel, and shield-iron F'' to permit of the proper raising of the cutter-bar without bringing said parts in contact with the rear part of the tongue.

J is a foot-lever pivoted on the same fulcrum *g* as lever I, so that a projection, J'', on the end of its short arm J' will work in a slot formed in the metal placed between the arms of lever I. As the driver presses on the long arm J he causes projection J'' to force back lever I, and thus can raise, or, at least, assist to raise the cutter-bar by his foot. When the cutters are raised, the main frame is caused to oscillate on wheels A M', the latter turning on a journal, *w*, fastened to the inside of piece M, attached to the end piece, E', which connects the inner end of E with the inner shoe, G', to which is firmly secured the inner end of finger-beam F, a tenon on the latter passing into a horizontal slot cast in shoe G', where it is held by bolt *q* working into a nut let into the top of the finger-beam, as shown in Fig. 2.

The construction of my machine is such that when the cutter-bar is raised the distance between the front of the main frame and the rear of the tongue is lessened, and when lowered the distance is increased, a feature which characterizes my machine, and which it is necessary to observe in order to a proper idea of the class of machines to which my improvements have been applied.

V is a shield-piece supported by standards *v' v'* on the edge of piece B to protect the limbs of the driver from getting into the main gear-wheel A.

Having described one practical way in which the invention which forms the subject of this patent can be carried out, the skill of the constructer will be sufficient to apply the same to various other mowing-machines in use.

I claim in this patent as my invention—

1. The combination of the following elements in a grass-harvester, viz: a main frame, a hinged tongue, to the rear inner side of which is pivoted a lever and a cutting device arranged in such relation to the main frame as that the front of the shoe which supports the heel of the finger-beam will project forward, beyond, or in advance of the front of the main frame, so as to permit of a free up-and-down motion in advance of the inner front corner of the main frame of the connection which connects the shoe with the lifting device or lever whose fulcrum or journal is on the rear of the hinged tongue.

2. The combination and arrangement of the main frame which supports the crank-shaft and the shoe which supports the heel of the finger-beam and cutter-bar, and the hinged tongue by which the machine is drawn in such a manner as that the end of the pitman which connects the crank-shaft will work in front of the front outer end or corner of the main frame, which is elevated above the ground, while the other end of the pitman, which is connected with the heel of the cutter-bar, will incline down in front of the inner front corner of the main frame to the shoe which supports the heel of the finger-beam, and which shoe is depressed below the front outer corner of the main frame and supported so as to run on the ground, whereby the crank end of the pitman is elevated above obstructions, and at the same time its motions are not obstructed or interfered with by the front of the main frame or the rear of the hinged tongue under which it works.

3. The combination, with the main frame of a grass-harvester, of a hinged tongue or draft-beam and a metallic shoe to support the heel end of the cutter-bar and finger-beam, substantially as set forth—that is to say, so that the hinge of the tongue will be in rear of the pitman which operates the sickle-bar, while the front end of the shoe extends forward, and is connected to an adjustable lifting-connection which works in front or advance of the pitman, in combination with a right-angled lever, or its equivalent, fulcrumed to the rear inner side of said tongue.

4. So arranging a right-angled lever fulcrumed on the rear inner side of a hinged tongue of a mowing-machine as that its horizontal arm will project forward as far, or nearly so, as the front of the shoe which supports the heel of the finger-beam, so as to prevent undue twisting of the parts or the adjustable connection by which they are connected when the driver is raising the cutting device.

In witness whereof I hereunto subscribe my name.

DAVID S. McNAMARA.

In presence of—
JOHN M. LANDON,
JOHN H. PECK.